US005722672A

United States Patent [19]
Frederick

[11] Patent Number: 5,722,672
[45] Date of Patent: Mar. 3, 1998

[54] REUSABLE PROTECTIVE COVER FOR SHOPPING CART HANDLE/RENTED STROLLERS

[76] Inventor: Sonya Frederick, 4211 Federal St., Rockville, Md. 20853

[21] Appl. No.: 570,546

[22] Filed: Dec. 11, 1995

[51] Int. Cl.[6] ............................................. B62B 3/02
[52] U.S. Cl. ........................... 280/33.992; 16/110 R; 150/154
[58] Field of Search .................... 16/110 R; 150/154, 150/155; 280/33.992, 33.993

[56] References Cited

U.S. PATENT DOCUMENTS

| | | |
|---|---|---|
| D. 328,812 | 8/1992 | Pritchett . |
| D. 357,784 | 4/1995 | Ince . |
| 3,866,649 | 2/1975 | Bringmann . |
| 4,805,937 | 2/1989 | Boucher et al. . |
| 4,881,746 | 11/1989 | Andreesen ...................... 280/33.992 |
| 4,954,384 | 9/1990 | Hartwell ........................... 150/154 X |
| 5,215,319 | 6/1993 | Farris . |
| 5,312,122 | 5/1994 | Doty . |
| 5,429,377 | 7/1995 | Duer ................................... 280/33.992 |

OTHER PUBLICATIONS

Lillian Vernon Corporation, "Lilly's Kids—Personalized Cart Organizer", front and back cover pages and p. 56, Fall, 1995.

Primary Examiner—Brian L. Johnson
Assistant Examiner—Michael Mar
Attorney, Agent, or Firm—Oliff & Berridge, PLC

[57] ABSTRACT

A removable protective cover can be attached to a shopping cart handle or a rented stroller. This alleviates disruption in shopping with a small child who is likely to chew on parts of a shopping cart or stroller. The cover can be removed, and is washable and reusable. Because of its composition, the cover can be easily folded and placed in a purse, diaper bag, or pocket. The cover may also include a T-shaped member that can provide further protection in addition to serving as a holding place for items such as a shopping list or coupons. Furthermore, the cover may include provisions for the attachment of toys, etc., and the cover itself may be structured to provide a child entertainment function.

8 Claims, 7 Drawing Sheets

REUSABLE PROTECTIVE COVER FOR SHOPPING CART HANDLE/RENTED STROLLERS

BACKGROUND OF THE INVENTION

This invention relates to shopping carts and rented strollers. More particularly, this invention relates to a protective cover for shopping cart handles and bars, and rented stroller parts that a small child will instinctively chew on.

It is common knowledge that when people shop at grocery, hardware or department stores, they will likely be using a shopping cart. For a person who shops with a small child, a shopping cart is a must in these types of stores. Although it is useful to have a place for the child to sit while shopping, the natural behavior of the child poses a problem.

Babies as young as three or four months old are known to chew on shopping cart handles or the seat basket frame. As soon as a baby is able, he will bring objects to his mouth. He does this mainly for two reasons. First, if the baby is teething, he will try to do this on almost any object. Second, this is a wonderful way for a baby to explore because the tongue and lips are laden with nerve endings thus making the mouth a perfect examining tool.

When the child puts his mouth on the aforementioned parts, parents begin to worry about the unsanitary condition of the object and will try to make the child stop, or often will place their hands over the chewing area as an alternative. This is to protect the child from contracting any possible germs or viruses. This not only is ineffective in keeping the germs away from the baby, but it also allows the shopper only one free hand.

As recently disclosed in the 1995 Fall catalog of Lillie's Kids, page 56, a product hangs from a shopping cart handle that has a pouch for storing snacks, a strap for carrying the device, and some toys that dangle therefrom. The problem with this product is that most small children and babies can be entertained or pacified for a short time while in the cart, but inevitably, they will tire of the minimal variety of toys offered to them and resort to their natural instinct to put something in their mouth. The added problem with the product as described is its bulkiness. A mother with a purse, diaper bag, or both, does not want another carrying device to sling over her shoulder.

In addition, U.S. Pat. No. 5,215,319 to Farris discloses several shopping cart handle cover embodiments. A first embodiment includes a semi-rigid product that presses over the cart handle. The drawback with this embodiment is that it is not easily transported, and offers no padding for the child's mouth. The second embodiment shows a terry cloth cover that is held in position by Velcro®. This also has its disadvantages because the material will allow germs to travel through the cover and into the child's mouth. The third embodiment is a flexible covering such as plastic wrap that is applied to the handle, which does not offer the child a padded surface to chew on. Moreover, when a baby is teething, there is a substantial amount of saliva being produced by the child's mouth. The plastic wrap material does not have absorbing characteristics, and therefore, the saliva that is secreted will not be absorbed. This will not only create a mess, but will make it difficult to remove the cover once the user is finished with it.

Another type of handle cover is disclosed in U.S. Pat. No. 4,805,937 to Boucher et al. While this cover is washable and foldable, the use of straps that are fastened with snaps presents a possible chewing or choking hazard. Additionally, this product is not easily foldable and easily compactable when considering all of its attachments. The rattle, squeaky toy, and the clothespin will add bulk. Also, the entire seat cushion apparatus in conjunction with the cart handle cover renders it impossible to place this product in an average size purse or diaper bag. This patent also discloses a shopping cart handle cover that is made of either a washable fabric or a padded vinyl material. The disadvantage to using the one layer of fabric is the same as the terry cloth cover disclosed in U.S. Pat. No. 5,215,319. Neither of the covers mentioned will prevent germs from traveling through the cover. The disadvantage to using a padded vinyl material is that the vinyl is on the top layer and does not have absorbing characteristics. Similar to the first and third embodiments in U.S. Pat. No. 5,215,319, a non-absorbing material as the top layer creates a mess, and makes the cover unpleasant to use.

SUMMARY OF THE INVENTION

One object of this invention is to provide a durable, sanitary cover for parts of shopping carts and rented strollers that babies chew on.

It is a further objective of the invention to provide an easily foldable, transportable, washable, and reusable cover that may be placed on parts of a shopping cart and the like when shopping with a baby.

It is yet a further object of the invention to protect babies and small children from contracting contagious diseases that may be carried by bacteria on parts of a shopping cart or rented stroller that are often chewed on.

Still another object of the invention is to provide a new and improved handle cover for a shopping cart that can overcome the disadvantages of the prior art.

Further yet, it is another object of the invention to relieve a shopper of some of the frustration caused by shopping with a small child.

Still yet another object of the invention is to provide a simple and affordable cover for a shopping cart handle or rented stroller.

According to a first aspect of the invention, there is provided a washable and reusable protective cover that releasably attaches to a selected portion of a mobile push cart adapted to hold a small child. The cover includes a flexible member having a top surface and a bottom surface opposite the first side, a first fastening member connected to the top surface, a second fastening member adjacent the first fastening member, connected to the bottom surface, and a third fastening member connected to the bottom surface opposite the second fastening member. The second fastening member is selectively fastenable to the third and fourth fastening members to form a tubular member around the selected portion of the push cart.

According to a second aspect of the invention, there is provided a washable and reusable protective cover that releasably attaches to a selected portion of a mobile push cart adapted to hold a small child. The protective cover includes a flexible member configured to wrap about the selected portion of the push cart to protect the small child against physical injury and bacterial infection.

These and other objects will be described in or apparent from the following detailed description of preferred embodiments.

BRIEF DESCRIPTION OF THE DRAWINGS

The invention will be described with references to the drawings, wherein.

DETAILED DESCRIPTION OF PREFERRED EMBODIMENTS

Figure 1:
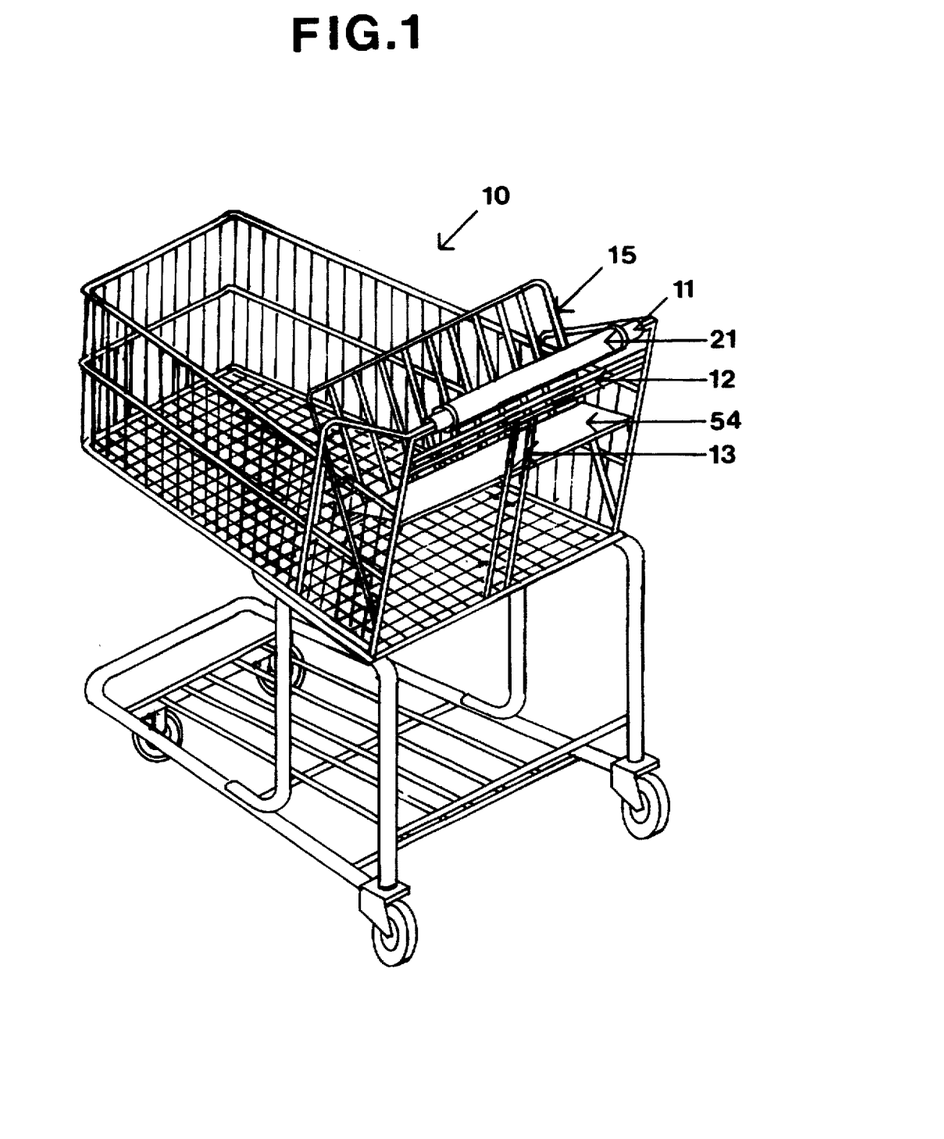
FIG. 1 is a perspective view of a shopping cart having a cover according to the present invention.

With reference now to FIG. 1, there is shown a shopping cart (10) with a typical shopping cart handle (11) and seat basket frame (15). The front of the seat basket frame has a horizontal section (12) and a vertical section (13) that keeps the child from slipping out of the basket seat (54). A shopping cart handle cover (21) is placed over the handle (11).

Figure 2:
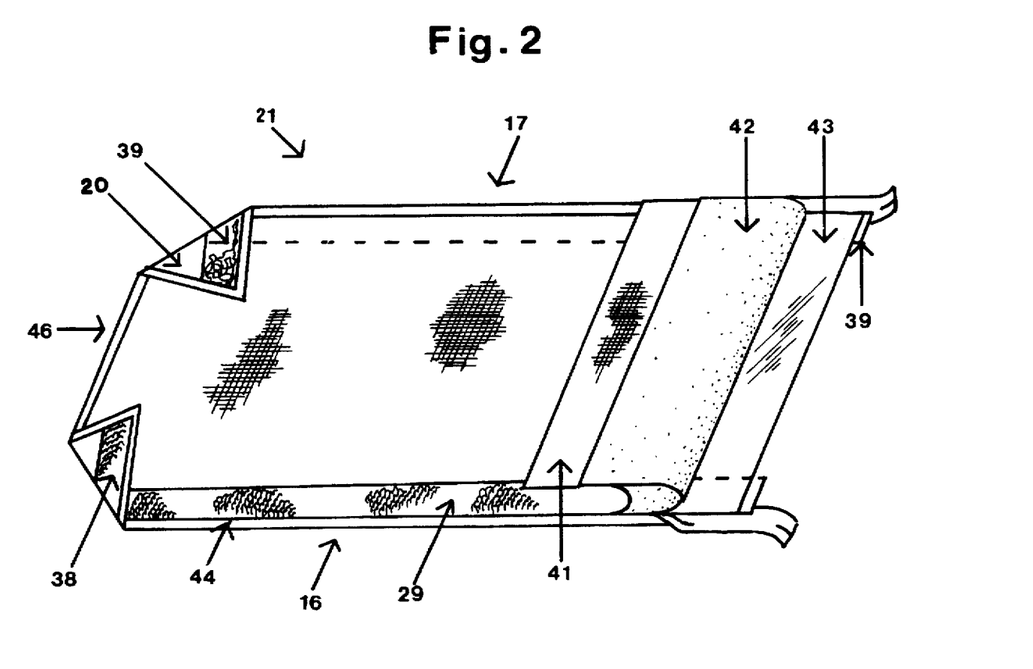
FIG. 2 illustrates a first embodiment of a shopping cart handle cover according to the present invention.

Referring now to FIG. 2, the handle cover (21) is shown with its layers peeled back for explanatory purposes. This embodiment will be described with reference to a rectangular shape, although other shapes are within the scope of the invention. With all layers being cut the same dimension, and rectangular in shape, the two long sides (16, 17) are slightly shorter than the length of the shopping cart handle (11) and the two short sides (46) are at least the circumference of the cart handle plus the width of cooperating hook and loop fasteners (29, 39), but preferably no more than twice the circumference of the cart handle (11). The top layer (41) is made of a durable, water resistant and moisture absorbing fabric, such as nylon sports fabric. The middle layer (42) is made of a sheet of padding or batting. The third layer (43) is made of a PVC sheeting, such as vinyl, that is nonporous and foldable. These layers are bound together with a sew-on type binding (44) that encloses all edges. On the bottom surface (20) of the cover (21) along one long edge (17), the loop portion (39) of a hook and loop fastener is attached. On the other long edge (16), hook portions (29 and 38) are applied to the top and bottom layers. This provides the cover (21) with versatility so that it can wrap around various members of the shopping cart. For example, the cover can wrap around the handle (11) in a tubular shape with the hook portion (29) attaching to the loop portion (39) on the bottom layer. Alternatively, the cover can fold over the horizontal section of the seat basket frame (12) with the hook portion (38) and the bottom layer loop portion (39) providing a connection.

Figure 3:
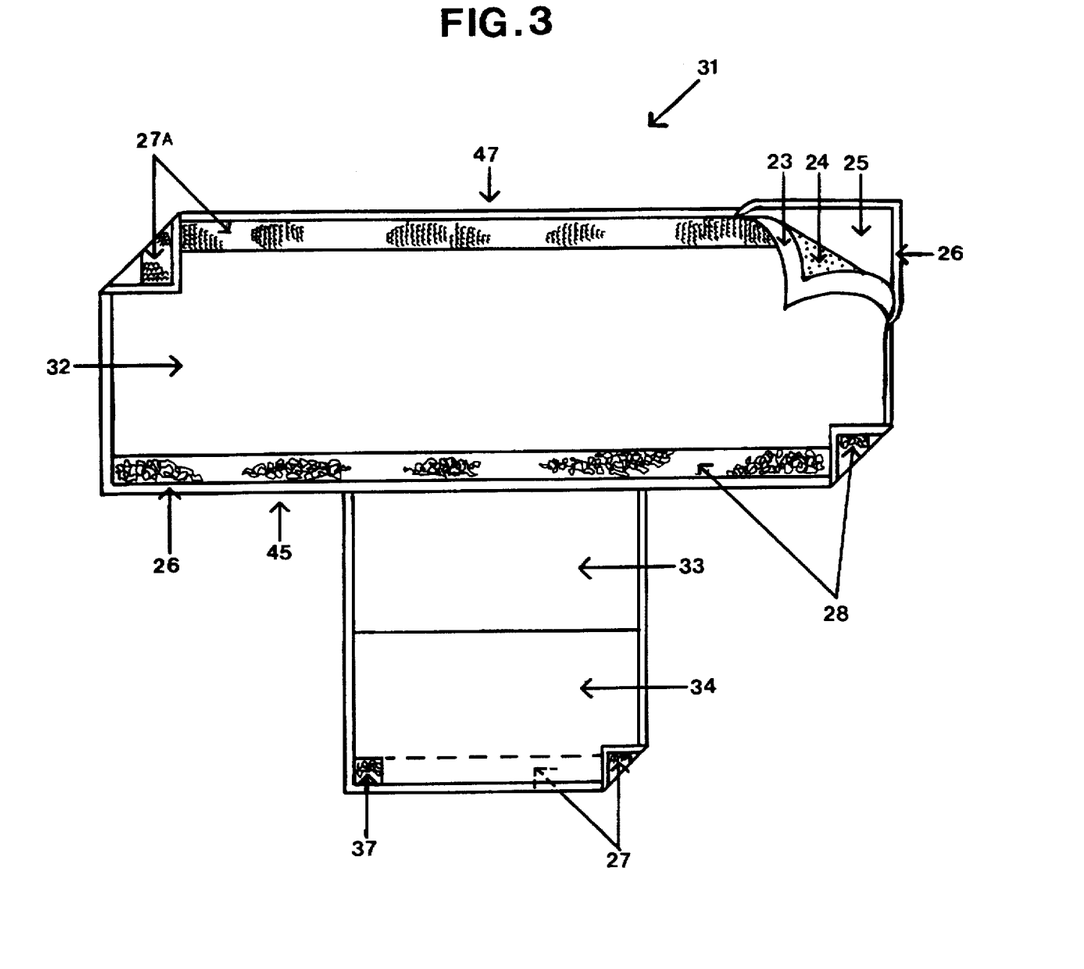
FIG. 3 illustrates a second embodiment of the shopping cart handle cover according to the present invention.

FIG. 3 shows a plan view of a T-shaped shopping cart handle cover (31) having three layers similar to, and being constructed similar to the shopping cart handle cover illustrated in FIG. 2. A vertical section (33) depends from the horizontal section (32), but is slightly shorter than the vertical portion of the seat basket frame (13) and includes a width that will allow it fasten to itself upon being wrapped about the intended vertical portion of the cart member. The vertical section (33) is cut from the same material as the top layer (23) of the horizontal section (32) and is attached to the center of the bottom edge (45). A layer of PVC sheeting (34), cut the same width as the vertical member (33) and approximately one half of its height, is placed at the bottom edge of the vertical section (33). The two layers are then bound together in the same manner as the horizontal section. Along the bottom edge of the vertical member (33) on the underside surface is a strip of the hook portion (27) of a hook and loop fastener. This will allow the vertical section (33) to be wrapped around and fastened to the horizontal section (32) when being used on the shopping cart handle (11). A tab (37) having a loop portion is cooperable with the hook fastener (27), and is positioned at the bottom of either corner of the vertical section (33) on the top surface of the member. This allows the vertical section (33) to fasten to itself when it is wrapped around the vertical bar of the seat basket frame (13). Hook portions (27A) extend along the top and bottom layers on the long edge of the horizontal section (47). Loop portions (28) extend along the top and bottom layers of the opposite edge of the horizontal section (45).

Figure 4A:
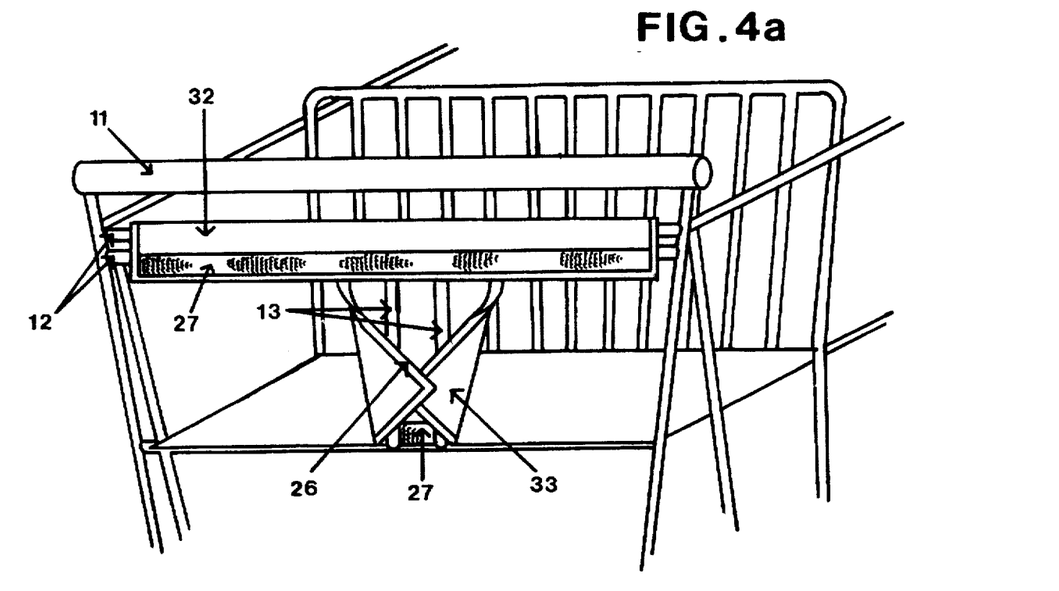
FIG. 4a is a perspective view of a shopping cart handle cover according to the second embodiment, attached to the seat basket frame of a shopping cart.
Figure 4B:
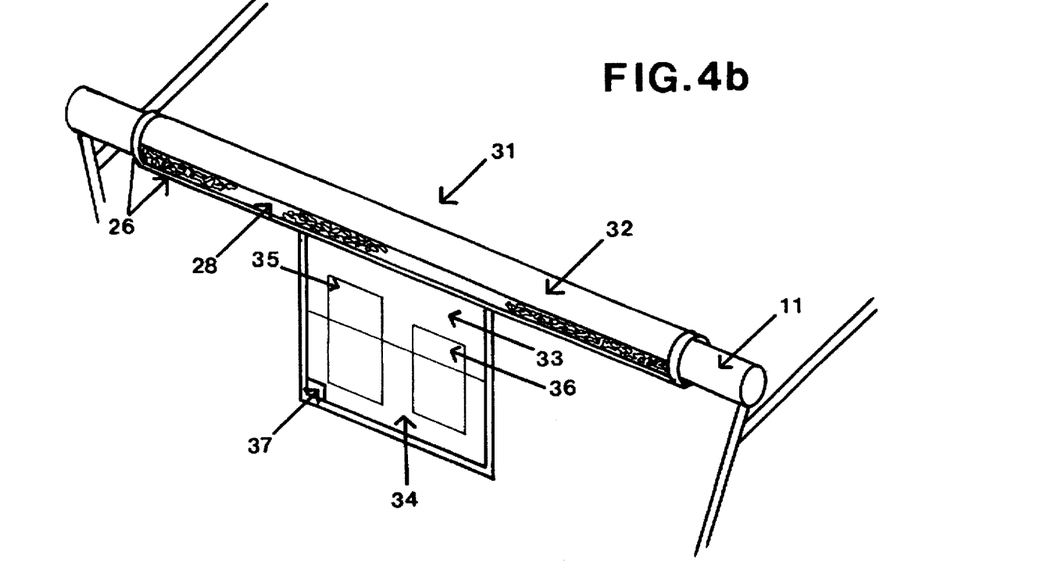
FIG. 4b is a perspective view of a shopping cart handle cover, according to the second embodiment, attached to the cart handle.

FIG. 4a illustrates a T-shaped shopping cart handle cover (31) where a horizontal section (32) is folded over the horizontal section of the seat basket frame (12) and fastened to itself. The vertical section (33) is wrapped around the vertical portion (13) of the seat basket frame and fastened to itself at the bottom, with the hook portion (27) facing away from the cart to prevent abrasion of the child's legs. FIG. 4b shows the T-shaped cover (31) positioned on the shopping cart handle (11) with the vertical section (33) hanging on the shoppers side of the cart (10). The clear PVC sheeting (34) faces away from the cart and includes at least one pocket for items such as a shopping list (35) and coupons (36).

Figure 5A:
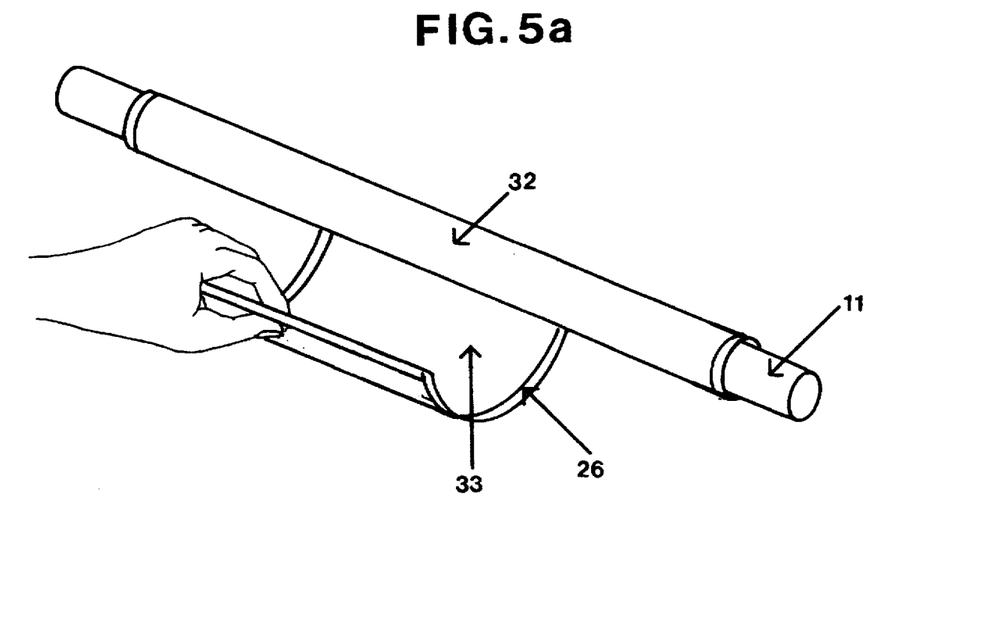
FIGS. 5a and 5b are illustrative views of a T-shaped shopping cart handle cover showing the vertical section being sequentially wrapped around the horizontal section.
Figure 5B:
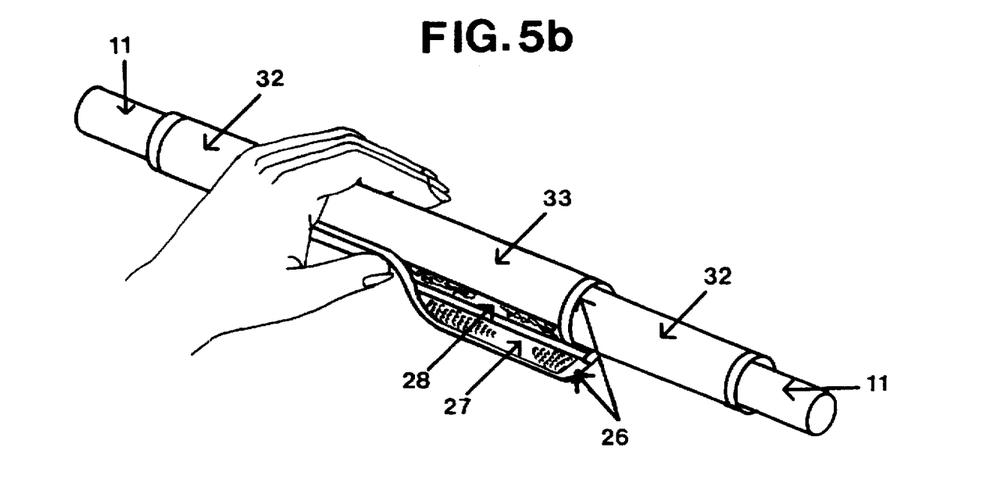

FIG. 5a shows the action of wrapping the vertical member (33) around the horizontal member (32) when it is in place on the shopping cart handle (11). FIG. 5b shows the action of fastening the vertical member (33) to the horizontal member (32) when it is in place on the shopping cart handle (11), wherein the hook portion (27) of the vertical section (33) engages with the loop portion (28) on the outer surface of the horizontal section (32).

Figure 6:
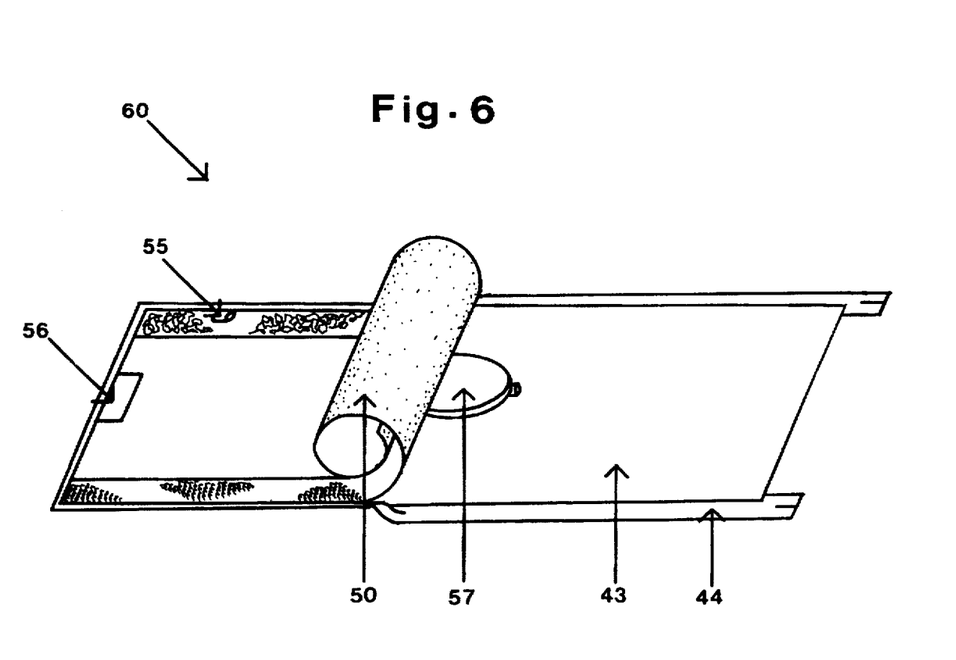
FIG. 6 is a perspective view of a handle cover using one of the alternative embodiments.

In FIG. 6, there is shown a shopping cart handle cover (60) in an alternative form, including a top layer of padded sports fabric (50), that is partially removed and a bottom layer of pvc sheeting (43). A squeaky (57) is placed between the top and bottom layers. Also shown is a loop (55) to provide a place to attach a toy or keys, and a label (56) for the consumer to personalize. The cover has hook and loop fasteners positioned in the same manner as the shopping cart handle cover (21) shown in FIG. 2. A batting layer may also be provided between layers (43) and (50), or the toy 57 may be enlarged to the entire size of the protective cover (60) to provide a dual function of a child entertainment and padding layer.

Figure 7A:
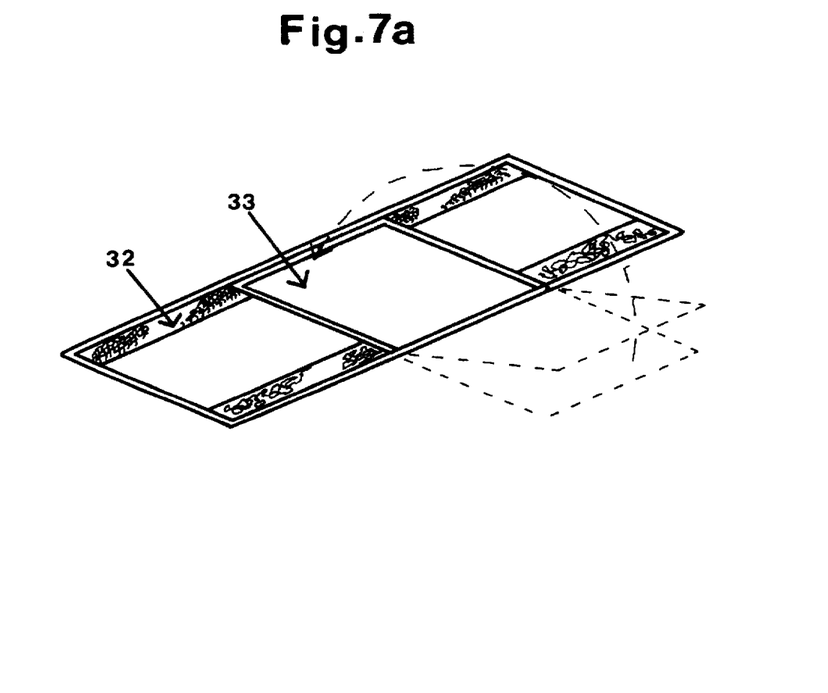
FIGS. 7a and 7b show a sequential folding operation for folding the protective cover.
Figure 7B:
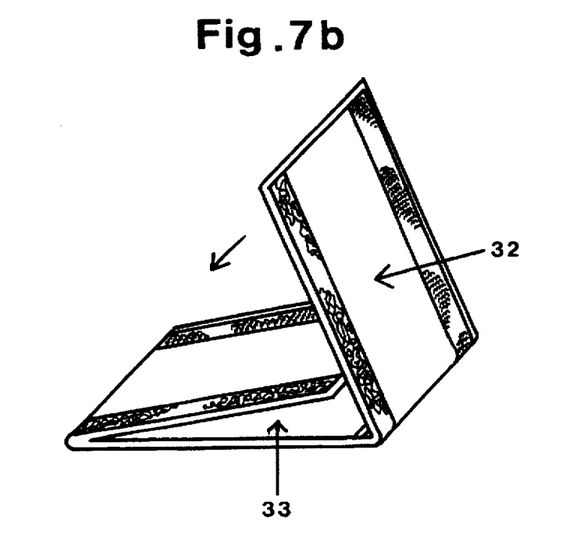

FIGS. 7a and 7b show a folding operation for storing the protective cover in a purse or handbag. In FIG. 7a, the vertical member (33) of the T-shaped shopping cart handle cover is folded over the horizontal member (32) so that the entire cover becomes rectangular in shape. FIG. 7b shows the two end sections of the horizontal member (32) being folded in, over the vertical member (33), one after another. The unit then can be folded along the center of the horizontal member and will attach to itself. Because of the placement of the fasteners, this can be accomplished with either side of the cover facing the outside. Moreover, the loop (37) can be mutually folded to mate with a hook portion of the horizontal section (32), or the hooks (27) of the vertical section can be initially folded inwardly, and the loop (37) can cooperate with the hook portion during the second folding step.

In another embodiment of the invention, there is provided a three layered product including a top layer that is durable and moisture resistant (such as nylon sports fabric), a middle layer of padding (such as batting), and a bottom layer of nonporous, but bendable material, (such as PVC sheeting or vinyl). The layers are cut into an appropriate shape such as a rectangle with all layers having the same dimensions and bound together on all four edges with a sew-on type binding such as twill tape. The importance of these layers is as follows: The durable top layer is recommended because it will not wear out from being washed or chewed on. It will absorb moisture, but will not deteriorate from it. Also, a child would not easily bite through it, and possibly get a piece in his mouth, which may result in choking. The middle layer of padding will protect the baby's mouth from bumping the hard surface of the shopping cart handle or seat basket frame. The third (nonporous) layer will keep germs from traveling through the cover. The product could be wrapped around a shopping cart handle and held into position with a hook and loop fastener that extends along the two long edges of the rectangle.

In yet another embodiment, a T-shaped product includes a vertical section and a horizontal section having layering structure similar to the first embodiment. A layer of clear PVC sheeting can be connected to the vertical section and cut at applicable heights, forming pockets, which face the front of a rented stroller or on the front section of a shopping cart. Alternatively, the vertical section can be wrapped about the horizontal section or the vertical bar of the shopping cart seat frame, where the child sits. The horizontal section of the T-shape can be wrapped around the horizontal part of the seat frame or stroller front, while the vertical section can be wrapped around the part of the stroller or cart that is placed between the child's legs, thus adding more protection from injury or germs. The vertical section will protect the child's legs from sharp edges or areas that may pinch the child's skin. The vertical section may also include at least one pocket that can be used to store a small toy or snack. The vertical section can be easily wrapped about the horizontal section if a baby outgrows the need for it. For example, after applying the horizontal section to the cart handle, the vertical section can wrap around the horizontal section and fasten to it. Alternatively, the vertical portion can hang from the horizontal section on the shopper's side of the cart so that the pocket may be used to store items such as coupons or a grocery list.

In other embodiments, the cover may include less than three layers provided that one layer can replace one or more layers of the other embodiments. For instance, a durable moisture resistant fabric that has a padded backing may take the place of the top and middle layers, thus aiding in the product's compactness.

In all of the above embodiments, a blank label (e.g., FIG. 6) may be attached by or for the consumer to personalize so that he may avoid confusion in the event of unintended interchanging with other consumers of this product. Also loops may be attached to fasten toys or pacifiers. However, these additions should preferably be placed out of the way of the child's chewing zone. In addition, a squeaky toy (FIG. 6) or sound producing crinkle material may be placed between the layers during construction, possibly directly in line with a character on the print of the top layer of the fabric making somewhat of a toy out of the cover itself, resulting in a more appealing situation for the child.

The invention has been described with reference to preferred embodiments thereof, which are intended to be illustrative, not limiting. Various modifications will be apparent to those of ordinary skill in the art without departing from the spirit and scope of the invention, as defined in the appended claims.

What is claimed is:

1. A washable and reusable protective cover that releasably attaches to a selected portion of a mobile push cart adapted to hold a small child, the cart including a horizontal handle, a horizontal frame section positioned below the handle, and a vertical frame section attached to the horizontal frame section and extending downwardly therefrom, the protective cover comprising:

a substantially T-shaped flexible member with a rectangular upper portion and a lower portion depending from a lower edge of a central portion of the upper portion, the flexible member having an inner surface and an outer surface;

a first fastening member attached to the upper portion along at least upper edge portions of the inner and outer surfaces;

a second fastening member attached to the upper portion along at least lower edge portions of the inner and outer surfaces;

a third fastening member attached to the lower portion along at least a lower edge portion of at least one of the inner and outer surfaces; and a fourth fastening member attached to the lower portion along at least a lower edge portion of at least one of the inner and outer surfaces;

wherein the upper portion is adapted to be selectively wrapped about either the handle or the horizontal frame section with the inner surface in engagement therewith and with the first and second fastening members interlocked together, the lower portion adapted to be wrapped about the outer surface of the upper portion when the upper portion is wrapped about the handle, and the lower portion adapted to be wrapped about the vertical frame section with the third and fourth fastening members interlocked together when the upper portion is wrapped about either the horizontal frame section or the handle.

2. The protective cover according to claim 1, wherein the flexible member comprises:

a moisture absorbing top layer;

a middle padded layer connected to the top layer; and a nonporous, bacteria resistant bottom layer that contacts said selected portion of the push cart and connects to the middle padded layer.

3. The protective cover according to claim 1, wherein said flexible member comprises:

a moisture absorbing top layer;

a nonporous, bacteria resistant bottom layer that contacts said selected portion of the push cart and connects to the top layer; and a padded material between the top and bottom layers.

4. The protective cover according to claim 1, wherein one of the third and fourth fastening members cooperates with one of the first and second fastening members when the lower portion is wrapped about the upper portion.

5. The protective cover according to claim 1, wherein the lower portion is structured to hang from the upper portion, and said lower portion includes at least one clear pocket adapted to hold an item.

6. The protective cover according to claim 1, wherein the lower portion can be folded into the upper portion, opposite ends of the upper portion are folded over the lower portion, and the upper portion is folded along a longitudinal axis to connect corresponding fasteners, thus holding the protective cover in a compact shape for storage.

7. The protective cover according to claim 1, wherein said flexible member comprises an integrally formed noise producing device.

8. The protective cover according to claim 7, wherein said flexible member includes a depressable member that activates said integrally formed noise producing device.

* * * * *